United States Patent
Raybould et al.

(10) Patent No.: US 7,465,423 B2
(45) Date of Patent: *Dec. 16, 2008

(54) LOW COST BRAZES FOR TITANIUM

(75) Inventors: Derek Raybould, Denville, NJ (US); Paul Chipko, Blairstown, NJ (US); Matthew Pohlman, Huntington Beach, CA (US)

(73) Assignee: Honeywell International, Inc., Morristown, NJ (US)

( * ) Notice: Subject to any disclaimer, the term of this patent is extended or adjusted under 35 U.S.C. 154(b) by 206 days.

This patent is subject to a terminal disclaimer.

(21) Appl. No.: 11/342,123

(22) Filed: Jan. 26, 2006

(65) Prior Publication Data

US 2006/0124706 A1    Jun. 15, 2006

Related U.S. Application Data

(62) Division of application No. 10/621,071, filed on Jul. 14, 2003.

(51) Int. Cl.
*B23K 35/24* (2006.01)
(52) U.S. Cl. .............. 420/417; 420/421; 420/581; 148/421; 148/422
(58) Field of Classification Search .......... 420/417, 420/421, 587, 581; 148/421, 422; 428/548
See application file for complete search history.

(56) References Cited

U.S. PATENT DOCUMENTS

| | | | |
|---|---|---|---|
| 3,998,632 A | * | 12/1976 | Kosteruk et al. .......... 420/422 |
| 4,144,057 A | * | 3/1979 | Melton et al. ............ 420/457 |
| 4,725,509 A | | 2/1988 | Ryan |
| 4,897,243 A | | 1/1990 | Mizuhara |

(Continued)

FOREIGN PATENT DOCUMENTS

EP    0456 481 A2    11/1991

(Continued)

OTHER PUBLICATIONS

Derwent 1992-011465 abstract of JP 03260046A, published Nov. 20, 1991.*

(Continued)

*Primary Examiner*—Roy King
*Assistant Examiner*—Tima M McGuthry-Banks
(74) *Attorney, Agent, or Firm*—Oral Caglar, Esq.

(57) ABSTRACT

A braze material and method of brazing titanium metals. The material may consist of Ti, Ni, Cu Zr, PM and M where PM is a precious metal and M may be Fe, V, Cr, Co, Mo, Nb, Mn, Si, Sn, Al, B, Gd, Ge or combinations thereof, with the (Cu+PM)/Ni ratio around 0.9. Optionally, a second brazing may be performed to rebraze any braze joint that did not braze successfully. The second brazing material has a lower braze temperature than the first and may consist of a mixture of Ti, Ni, Cu, Zr PM and M with from 1-20 wt % more Zr, PM, M or combinations thereof than the first braze. The braze material may be placed on a base material, in a vacuum furnace, and heated to form a braze joint between the braze and base material. The heating step may occur from about 800-975° C. and over 3 to 15 minutes.

9 Claims, 4 Drawing Sheets

U.S. PATENT DOCUMENTS

| | | | |
|---|---|---|---|
| 4,989,773 | A | 2/1991 | Ishiyama |
| 5,013,612 | A | 5/1991 | Hunt et al. |
| 5,240,491 | A | 8/1993 | Budinger et al. |
| 5,873,703 | A | 2/1999 | Kelly et al. |
| 6,149,051 | A | 11/2000 | Vollmer et al. |
| 6,223,976 | B1 | 5/2001 | Clement et al. |
| 6,482,537 | B1 | 11/2002 | Strangman et al. |
| 6,613,123 | B2 * | 9/2003 | Corbin et al. .................. 75/255 |
| 2006/0118600 | A1 * | 6/2006 | Raybould et al. ........... 228/101 |

FOREIGN PATENT DOCUMENTS

| | | | |
|---|---|---|---|
| GB | 752117 | * | 7/1956 |
| JP | 59126739 A | * | 7/1984 |
| JP | 2001 212664 | | 4/2001 |

OTHER PUBLICATIONS

"Grit and Microgrit Grading Conversion Chart" at READE. http://www.reade.com/Sieve/grit_conversion.html. Copyright 1997.*

Derwent Acc No. 1984-216392. Abstract for patent family JP 59126739 A, published Jul. 21, 1984 and JP 95017975 B2. , published Mar. 1, 1995.*

Hoffman, "Evaluation of Enhanced Diffusion Bonded Beta Titanium Honeycomb Core Sandwich Panels With Alpha-2 Titanium Aluminide Face Sheets," NASP Technical Memorandum, 1191 p. 1135.

Cadden, "Microstructural Evolution and Mechanical Properties and Braze Joints in Ti-13.4 Al-21.2 Nb," Welding Research Supplement, Aug. 1997, pp. 316-325s.

Onzawa et al., "Brazing of Titanium Using Low-Melting Point Ti-Based Filler Metals," Welding Research Supplement, Dec. 1990, pp. 462-467s.

Huang et al., "Effect of Heat Treatment on the Microstructure of a Metastable .beta.-Titanium Alloy," Journal of Materials Engineering and Performance, Aug. 1994, v. 3(4), pp. 560-566.

Botstein et al. "Brazing of titanium-based alloys with amorphous 25 wt. % Ti-25 wt. % Zr-50 wt. % Cu filler metal," Materials Science and Engineering, 1994, pp. 305-315.

Rabinkin, "New Applications for Rapidly Solidified Brazing Foils," Welding Journal, Oct. 1989, pp. 39-46.

Sorenson, "Titanium Matrix Composites," NASP Contractor Report, 1990 p. 1096.

Xu, Q et al. (University of Manitoba), "*Diffusion Brazing of a TiAl alloy*", Advanced Brazing and Soldering Technologies, 57-64, International Brazing & Soldering Conference, 2000, XP009038231.

* cited by examiner

LOW COST BRAZES FOR TITANIUM

CROSS REFERENCE TO RELATED APPLICATIONS

This patent application is a divisional of U.S. patent application Ser. No. 10/621,071, filed Jul. 14, 2003.

BACKGROUND OF THE INVENTION

The present invention generally relates to a material for and method of joining metals and, more particularly, to improved materials and methods for brazing titanium alloys including Beta 21S.

Titanium alloys have been of considerable interest in many applications due to their desirable performance characteristics. Such alloys provide low density, high strength, fatigue resistance, corrosion resistance, and good strength-to-weight ratio. Because titanium alloys weigh a great deal less than stainless steel and nickel based alloys, they have provided great advances in many fields where there is a constant drive to minimize design weight. For instance in aerospace applications, aircraft heat exchangers and the like greatly benefit from reduced weight. The operating conditions of heat exchangers also involve high stresses induced by pressure and temperature, combined with fatigue loading. Another desirable characteristic of titanium alloys is their ability to withstand high temperatures, as the temperature in aircraft heat exchangers can be in excess of 1000° F.

Of the various titanium alloys that exist, metastable beta-titanium alloys are of great interest, particularly in aerospace applications requiring highly formable sheet metal or foil gages. One of the most promising beta alloys is Beta 21S, i.e., a beta alloy containing about 21% of alloying additions. Beta 21S, Ti-15Mo-3Nb-3Al-0.2Si, was developed to overcome some of the disadvantages of the other titanium alloys. As an example, alpha-beta alloys tend to have poor formability, while other beta alloys tend to have reduced elevated temperature properties. In contrast, Beta 21S has good formability, good elevated temperature properties, low density, and oxidation resistance.

Yet, the ability to employ Beta 21S in aerospace or other applications is limited by the ability to join pieces of Beta 21S together. Without the ability to adequately join, any application is limited in size and complexity. That is, the application is limited by the ability to make and form a single piece of a base material large enough to make the final product. If a mechanical joining process is needed to join multiple pieces of base material, weight savings from the base material itself may be lost. And the product design may require changes to accommodate a mechanical fastener. Additionally, the ability to attach objects to the base material can become limited by the physical presence of a mechanical fastener which might need to be located at the joiner point between the base material and the object.

On the other hand, the advantages of a non-mechanical joining process of base materials can be significant. Some non-mechanical or metallurgical joining processes have included welding, diffusion bonding and brazing. The advantages of non-mechanical joining can be most evident particularly when the base material is of a thin gage type and, thus, weight savings are increased. A thin gage material might be of an order around 0.002 to 0.090 inches thick. Also, and unlike a mechanical fastener, a non-mechanical joint can minimize the disadvantages of joining an object where the base material is itself joined. This minimization is achieved since the bulk or space occupied by mechanical fasteners are omitted.

Still, there are disadvantages from non-mechanical joining. The disadvantages can include excessive alloying, metallurgical interactions, dissolution and erosion of base materials, and degradation of mechanical properties. In spite of the disadvantages and because of the advantages provided by titanium alloys, including Beta 21S, considerable effort has been made in the past to improve non-mechanical joining. Much of the effort has recently focused on brazing.

Brazing may be generally characterized as exposing the base material and braze material to a temperature sufficient to cause the braze material to melt. The atoms from the braze material then interdiffuse with the atoms in the base material. Upon the braze material solidifying, a joint is formed. While the general brazing process appears to be clear and straightforward in principle, research indicates to the contrary. The quality of the braze joint is highly dependent upon various factors in the brazing process, such as temperature, rate of heating and cooling, composition of the braze material and composition of the base material. While the attempts to determine the effect of these factors have been many, their interdependent relationships remain less clear.

As an example of temperature and braze material dependency, C. Cadden et al., "Microstructural Evolution and Mechanical Properties and Braze Joints in Ti-13.4 Al-21.2 Nb," Welding Research Supplement, pp. 316-325s (August 1997) addressed an alpha-two Ti base material with a Ti—Cu—Ni braze material. Cadden et al. indicate that, depending upon the braze temperature, the braze joint can have a room temperature tensile strength comparable to alpha-two and an elevated temperature (649° C. and 760° C.) tensile strength of 70 to 80% of the base metal tensile strength. Even with different nickel contents in the braze material, the average nickel content in the joint was found to be nearly constant. However, as between a rapidly solidified melt-spun braze foil and a laminated braze foil, the latter produced higher levels of nickel in the centerline of the joint, which was believed to lead to poorer room temperature tensile behavior. This indicates that the homogeneous rapidly solidified braze may have advantages over the braze comprised of foils (Cu/Ti/Ni) laminated together. However, melt spinning is an expensive process and cannot produce foil. Rather, melt spinning only produces narrow strips of varying thickness, which are difficult to use. Planner Flow Casting was developed to produce braze foil with a rapid solidified or amorphous structure. However, for Ti and Zr alloys, the nozzles used to cast the liquid metal and control its dimensions are quickly eroded and economic production of the desired braze foils is not possible.

In another study of how temperature can affect the braze joint, T. Onzawa et al., "Brazing of Titanium Using Low-Melting Point Ti-Based Filler Metals," Welding Research Supplement, pp. 462-467s (December 1990) investigated the base materials of commercially pure titanium (CPTi) and Ti-6 Al-4 V. The different filler metals used with the base materials included Ti-37.5Zr-15Cu-10Ni, Ti-35Zr-15Cu-15Ni and Ti-25Zr-50Cu. Onzawa et al. concluded that brazing above the alpha-beta transformation temperature and the beta transus temperature of the base metal would cause the grains in the base metal to coarsen and fine Widmanstatten structure to form at the joint area. This resulted in poor mechanical properties. Below the transition temperatures, the fine grains of the base metals were preserved, as well as the braze zone being distinct from the braze metal. This led to better mechanical properties. Onzawa et al. also determined that a shorter holding time at a braze temperature could improve the mechanical properties.

The effect of temperature and cooling rate on Beta 21S was described by Huang et al., "Effect of Heat Treatment on the Microstructure of a Metastable .beta.-Titanium Alloy," Journal of Materials Engineering and Performance, v. 3(4), pp. 560-566 (August 1994). They found that alpha precipitated preferentially on the grain boundaries during higher temperature aging and within the grains during lower temperature aging. High temperature solutioning produced a coarse grain size, while resolutioning treatment followed by slow cooling (such as during brazing) resulted in alpha precipitation. But with air cooling, precipitation was suppressed.

Another temperature and cooling rate investigation involved Ti—Pd and Ti-6Al-4 V alloys brazed with 25Ti-25Zr-50Cu. Botstein et al. "Brazing of titanium-based alloys with amorphous 25 wt. % Ti-25 wt. % Zr-50 wt. % Cu filler metal," Materials Science and Engineering, pp. 305-315 (1994). Botstein et al. determined that high heating and high cooling rate created only traces of Widmanstatten structure at the joint interface. On the other hand, low heating and low cooling rate tended to result in a coarse dendritic structure having high microhardness and low fracture strength.

In investigating the confluence of temperature, cooling rate, braze material and base material, Rabinkin, "New Applications for Rapidly Solidified Brazing Foils," Welding Journal, pp. 39-46 (October 1989) described rapid solidification as a process having high cooling rates that allow stabilization of alloys into an amorphous state. Because such alloys provide "instant melting," Rabinkin indicated that they can be used to braze at lower temperatures and for a shorter time. As pointed out, these features are well suited to brazing items such as fine-gauge honeycomb which require protection from molten filler metals. More importantly, according to Rabinkin, is the ductility of the alloys, thus eliminating the need for large joint clearances to fill the braze cross-section. Rapidly solidified foils of 75Ti-15Cu-15Ni (sic) and 83.1Zr-16.9Ni were considered by Rabinkin to be advantageous for titanium base materials. On the other hand, Rabinkin indicated that braze powders have drawbacks that the rapidly solidified foils overcome. Apparently included in the group of disadvantageous powders is Ti—Zr—Cu—Ni which had been used on titanium based alloys, including tubing and honeycomb aircraft structures. However, we have already indicated that the plannar flow casting technique used to produce these amorphous foils relies upon a nozzle that is quickly eroded by molten Ti and Zr, resulting in short production times and high costs. There are also problems associated with casting the Ti in air, as usual occurs with planar flow casting. Casting in vacuum or inert gas is possible, but significantly increases costs and makes the production of foil with a uniform thickness and width even more difficult. A variation in foil thickness will affect the ability of the foil to produce a good braze, as the gap between the two parts to be brazed varies. For example, in some areas the braze may not touch the two parts to be brazed, and therefore may not braze them both. Also, variations in width require the foil to be hand cut and positioned. This also results in increased costs.

U.S. Pat. No. 6,149,051, issued to (AlliedSignal) Honeywell discloses a method of brazing a Ti-15 Mo-3 Nb-3 Al-0.2 Si base material including the steps of coating a braze material onto a base material. The braze material comprises substantially only a Ti—Cu—Ni—Zr mixture, with the mixture comprising about 40% Ti, 20% Cu, 20% Ni and 20% Zr. The braze material is heated then a braze joint is formed between the braze and base materials. The heating step can occur from 760 to 932° C. and over 15 to 90 minutes. While this solves many of the problems of incomplete brazing, it is a very costly method especially because of the addition of the extremely expensive Zr, but also because the techniques to make the braze alloy, such as powder atomization, mechanical alloying or mechanically commutation (i.e. breaking up a large ingot to powder), are expensive. Also, the brazing must be closely controlled requiring an initial heating and a subsequent heating. The '051 patent briefly states that as well as an alloyed powder the braze composition might be obtained by admixing elemental powders, but gives no details. This is because while this approach is recognized as feasible it has not been considered desirable. Problems with it are that the braze is very non-homogeneous and therefore melts over a wide temperature range making brazing difficult and producing a poor low strength braze joint. We have already discussed the problems described by Rabinkin "New Applications for Rapidly Solidified Brazing Foils," Welding Journal, pp. 39-46 (October 1989) for alloyed powders. These are significantly increased for elemental admixed powders, which would be even more "disadvantageous" than prealloyed powders. Another problem is that these elemental powders have high oxide contents, which also reduces the properties of the braze. It would be desirable to use these admixed elemental powders in order to reduce cost, but this would require the disadvantages of a wide melting range, non-homogeneous braze microstructure and composition and the high oxide problem to be solved.

Further, it would be desirable to have a braze that allows for a second brazing at a lower temperature. For example, a heat exchanger may have 1000 joints that need to be brazed. The first braze may only effectively braze 90% of the joints, leaving 10% or 100 joints with leaks. It would be desirable to go back and rebraze the 100 joints that did not properly braze, rather than scrap the part. However, not at the risk of harming the 90% of the brazes that properly brazed. The present invention solves this problem, by providing a first brazing and optionally a second brazing with a lower melting temperature, yet at the same time no or minimal amounts of Zr.

Further, it would be desirable to decrease the thermal exposure experienced by the titanium parts being brazed. The cited prior works describe rapid heating and cooling cycles and the short times at temperature. A reduction in the braze temperature, as we show to be possible, would greatly reduce thermal exposure.

As can be seen, there is a need for improved methods for brazing beta titanium alloys. There is a particular need for improved brazing methods that are less temperature and/or time dependent such that processing parameters need not be so tightly controlled, and there is also a related need to reduce braze temperature. A further need is a braze which is does not erode the titanium substrate. This is particularly important for thin foil, as any erosion will quickly melt through the foil. Erosion occurs due to the required use of braze temperatures higher than the melt temperature of the braze material. Also, erosion occurs because the melt temperature of the braze changes as Ti from the substrate is dissolved into the braze. This in turn changes its composition, i.e. the use of a non-optimum braze composition. There is also a need to produce a homogeneous braze microstructure, without the expense of rapid solidification techniques. Likewise, there is a need to provide an improved brazing method, which enables other objects to be welded at the brazed joint to further fabricate a complex assembly, but without deteriorating the brazed joint. There is a further need to provide a brazing method which can utilize a powder braze material which is easy and economical to formulate. Also, there is a need for a braze material that allows for a second brazing, when needed, at a lower temperature.

SUMMARY OF THE INVENTION

In one aspect of the invention, a brazing material and method for joining titanium metals is disclosed. This brazing material and its method of use may be particularly well suited for aerospace applications, and more particularly for use within heat exchangers. The brazing material may have 44-70% by weight Ti; 15-24% by weight Ni, and 15-20% Cu. Preferably, the Cu/Ni ratio is around 0.8. The method may have a first brazing step, which does not require Zr, which as discussed previously is very expensive. However, a second heating may be optionally utilized which adds a minimal amount of Zr and/or a precious metal (PM) such as Ag, 1 to 12% to the first braze, to provide a high percentage of brazes, yet contain the costs associated. (Ag is ~⅓ the cost of Zr.) The use of the Zr and/or the PM addition lowers the melting temperature of the braze, thus providing a second melting point of the braze material.

In one aspect of the invention, a brazing material and method for joining titanium metals is disclosed. This brazing material and its method of use may be particularly well suited for aerospace applications, and more particularly for use within heat exchangers. The brazing material may have 44-70% by weight Ti, 15-24% by weight Ni, and 15-20% by weight Cu and Ag or other precious metal, PM. Preferably the (Cu+PM)/Ni ratio is around 0.9. The method may have a first brazing step, which does not require Zr, which as discussed previously is very expensive. However, a second heating may be optionally utilized which adds a minimal amount of either Zr or more Ag (PM) in the amount of 1 to 12% by weight to the first braze, to provide a high percentage of brazes, yet contain the costs associated. The Zr or Ag (PM) lowers the melting temperature of the braze, thus providing a second melting point of the braze material.

In another aspect of the present invention, a method of brazing a titanium metal is disclosed comprising the step of coating a braze material onto a base material. The braze material may be a mixture of Ti, Cu, Ni powders comprising 44-70 wt % Ti, 10-30 wt % Cu, 10-30% by weight Ni, with preferably a Cu/Ni ratio of around 0.8. It was surprisingly found that when the particle size of the powders is less than 60 µm many of the previously discussed problems are alleviated. For example, problems associated with admixed elemental powders disappeared. Also, strong homogeneous braze joints could be formed with the braze melting over a narrow braze temperature range. Thus, surprisingly producing results similar to a good prealloyed braze powder or even a rapidly solidified braze. The base material with the braze material may be placed in a vacuum furnace and heated for a given braze time, up to a temperature that is not more than a braze temperature of the braze material, to achieve thermal stability between the braze material and the base material. This may result in a braze joint between the braze and the base material.

In yet another aspect of the present invention, a method of brazing a beta phase titanium metal is disclosed comprising the step of coating a first braze material onto a base material. The first braze material may be a mixture of Ti, Cu, and Ni powders, 44-70 wt % Ti, 10-30 wt % Cu, 10-30% by weight Ni, with preferably a Cu/Ni ratio of around 0.8. The base material with the braze material may be placed in a vacuum furnace, and a first heating performed to achieve thermal stability between the braze material and the base material. The first heating is up to a temperature that is not more than a first braze temperature of the braze material. A second braze material may be coated onto the base material. The second braze material being a mixture of Ti, Cu, Ni, and Zr powders comprising 44-70 wt % Ti, 10-30 wt % Cu, 10-30% by weight Ni, and 0.5-12% by weight Zr, and a second heating of the braze material performed up to a second braze temperature, forming a braze joint between the braze and the base material.

In yet another aspect of the present invention, a method of brazing a titanium metal within a heat exchanger is disclosed comprising the step of coating a braze material onto a multitude of portions of a base material. The braze material being a mixture of Ti, Cu, Ni powders comprising 57 wt % Ti with a particle size of ≦20 µm, 19 wt % Cu with a particle size of ≦20 µm, and 24% by weight Ni with a particle size of ≦20 µm. The base material with the braze material coated, on a multitude of portions, may be placed in a vacuum furnace and heated with a five minute hold at temperature to achieve thermal stability. The heating is up to a brazing temperature of 940° C. A multitude of braze joints are formed between the braze and the base material. The braze joints may be examined to determine whether a second brazing is needed and/or desirable. If needed and/or desirable, a second brazing may be performed comprising the steps of coating a multitude of selected portions of the base material with a second braze material. The second braze material may be obtained by simply adding a small quantity of Zr or Ag (PM) powder to the first braze forming a mixture of Ti, Cu, Ni and Zr powders comprising 54 wt % Ti with a particle size of ≦20 µm, 18 wt % Cu with a particle size of ≦20 µm, 23% by weight Ni with a particle size of ≦20 µm, and 5% by weight Zr or Ag (PM) with a particle size of ≦20 µm. The base material with the second braze material may again be placed in a vacuum furnace and heated for a given braze time to achieve thermal stability. The second braze material and the base material may be heated to a temperature that is not more than a second brazing temperature of said second braze material to form a braze joint between said braze and said base material. The second brazing temperature is around 900° C., safely less than the first brazing temperature so the first braze joints are not affected by the second brazing operation.

In yet another aspect of the present invention, a method of brazing an isomorphous beta phase only titanium base material to form a heat exchanger is disclosed comprising the step of coating a braze material onto a multitude of portions of a base material. The braze material may be a mixture of Ti, Cu, Ni, Ag (PM) powders comprising 50 wt % Ti with a particle size of ≦20 µm, 18 wt % Cu with a particle size of ≦20 µm, 22% by weight Ni with a particle size of ≦20 µm, and 10% by weight Ag (PM) with a particle size of ≦20 µm. The base material with the braze material may be placed in a vacuum furnace. A first heating may be performed on the braze material and the base material for five minutes to achieve thermal stability between the braze material and the base material. The heating may be between 910° C. and 920° C. A multitude of braze joints may be formed between the braze material and the base material. The braze joints may be examined to determine whether a second brazing is desirable. If a second braze is desired, a second brazing may be optionally performed, comprising the steps of coating a multitude of selected portions of the base material with a second braze material. The second braze material may be a mixture of Ti, Cu, Ni, Ag (PM) and Zr powders comprising 45 wt % Ti with a particle size of ≦20 µm, 20 wt % Cu with a particle size of ≦20 µm, 20% by weight Ni with a particle size of ≦20 µm; 10% by weight Ag (PM) with a particle size of ≦20 µm, and 3% by weight Zr with a particle size of ≦20 µm. The base material with the second braze material may be placed in a vacuum furnace and a second heating performed. The second heating may be up to a second braze temperature between 870° C. and 880° C. and at a rate in a range of 1.1 to 7.7° C./minute. This may form a braze joint between the second braze material and the base material. The braze joint may be cooled and solidified. In the unlikely case that all the braze joints are not now good then a third brazing operation may be performed by adding a slightly higher % of Zr and Ag (PM) to the first and second braze material. The third braze material may be a mixture of Ti, Cu, Ni, Ag (PM) and Zr powders comprising around 29 wt % Ti with a particle size of ≦20 µm, 21 wt % Cu with a particle size of ≦20 µm, 20% by weight Ni with a particle size of ≦20 µm, 20% by weight Ag (PM) with a particle size of ≦20 µm, and 15% by weight Zr with a particle size of ≦20 µm. The third heating may be performed in the range of 815 to 825° C. Again safely below the temperature used to form the successful brazes in the first and second operation so that these are not affected, de-brazed, by the third operation.

According to another aspect of the present invention, a method of brazing a titanium metal is disclosed comprising the steps of coating a first braze material onto a base material, the first braze material being based on the Ti—Ni—Cu, Ti—Ni—Cu—Ag, Ti—Ni—Cu—Zr or Ti—Ni—Cu—Ag—Zr systems already described to which is added 1 to 20% of M, where M may be Fe, V, Cr, Co, Mo, Nb, Mn, Si, Sn, Al, B, Gd, Ge or combinations there of. M is added to in order to further reduce the braze temperature, substitute for the expensive elements such as Zr or to improve desirable properties, such as corrosion and oxidation protection by reducing for instance the Cu content. Ti, Cu, Ni and M 30-80 wt % Ti, 10-30 wt % Cu, 10-30 wt % Ni and 1-20 wt % M; placing the base material with the braze material in a vacuum furnace; performing a first heating of the braze material and the base material to achieve thermal stability between the braze material and the base material, the first heating being up to a temperature that is not more than a first braze temperature of the braze material; coating a second braze material onto the base material, the second braze material being a Ti, Cu, Ni, M and Zr or Ag (PM) comprising 30-70 wt % Ti, 10-30 wt % Cu, 10-30 wt % Ni, 1-20 wt % M, and 0.5-15% by weight Zr and or Ag (PM); performing a second heating of the braze material and the base material up to a second braze temperature; and forming a braze joint between the braze and the base material.

According to another aspect of the present invention, a method of brazing a titanium metal is disclosed comprising the steps of coating a first braze material onto a base material, the first braze material being based on the Ti—Ni—Cu, Ti—Ni—Cu—Ag, Ti—Ni—Cu—Zr or Ti—Ni—Cu—Ag—Zr systems already described to which is added 1 to 20% of M with a particle size of ≦20 µm, where M may be Fe, V, Cr, Co, Mo, Nb, Mn, Si, Sn, Al, B, Gd, Ge or combinations there of. M is added to in order to further reduce the braze temperature, substitute for the expensive elements such as Zr or to improve desirable properties, such as corrosion and oxidation protection by reducing for instance the Cu content. A mixture of Ti, Cu, Ni and Fe powders 30-80 wt % Ti, 10-30 wt % Cu, 10-30 wt % Ni and 1-20 wt % M; placing the base material with the braze material in a vacuum furnace; performing a first heating of the braze material and the base material to achieve thermal stability between the braze material and the base material, the first heating being up to a temperature that is not more than a first braze temperature of the braze material; coating a second braze material onto the base material, the second braze material being a mixture of Ti, Cu, Ni, M and Zr or Ag (PM) powders comprising 30-70 wt % Ti, 10-30 wt % Cu, 10-30 wt % Ni, 1-20 wt % M, and 0.5-15% by weight Zr and or Ag (PM); performing a second heating of the braze material and the base material up to a second braze temperature; and forming a braze joint between the braze and the base material.

These and other features, aspects and advantages of the present invention will become better understood with reference to the following drawings, description and claims.

BRIEF DESCRIPTION OF THE DRAWINGS

FIG. 5a (Ti Ni Cu) carried out with a short exposure time, and of a braze of mixed powder of <44 µm (<325 mesh); FIGS. 5b and c also brazed for the same time, but at a lower temperature. The extensive grain growth that occurs with the conventional braze and the benefit of reducing the braze temperature can be clearly seen by comparing the grain size in FIGS. 5a and 5c.

DETAILED DESCRIPTION OF THE INVENTION

The following detailed description is of the best currently contemplated modes of carrying out the invention. The description is not to be taken in a limiting sense, but is made merely for the purpose of illustrating the general principles of the invention, since the scope of the invention is best defined by the appended claims.

The present invention provides a braze material and method of brazing titanium metals. The material consists of a mixture of Ti, Ni and Cu powders with a particle size less than 60 µm. Optionally, a second brazing may be performed to rebraze any braze joint that did not braze successfully. The second brazing material may consist of a mixture of Ti, Ni, Cu plus Zr and or Ag (PM), also with a particle size less than 60 µm. Because of this, minimal amounts of Zr and or Ag (PM) may be used, while still achieving higher percentages of brazes without leaks. Optionally a third brazing composition may be used comprising the Ti—Ni—Cu, Ti—Ni—Cu—Ag, Ti—Ni—Cu—Zr or Ti—Ni—Cu—Ag—Zr systems already described to which is added 1 to 20% of M with a particle size of ≦60 µm, where M may be Fe, V, Cr, Co, Mo, Nb, Mn, Si, Sn, Al, B, Gd, Ge or combinations there of. M is added to in order to further reduce the braze temperature, substitute for the expensive elements such as Zr or to improve desirable properties, such as corrosion and oxidation protection by reducing for instance the Cu content.

The braze materials described allow the braze temperature to be reduced for the first and any subsequent brazes. This allows a significant reduction in the thermal exposure experienced by the titanium and braze. A temperature reduction is more beneficial than a reduction in the time at temperature as described in the prior art.

Figure 1:
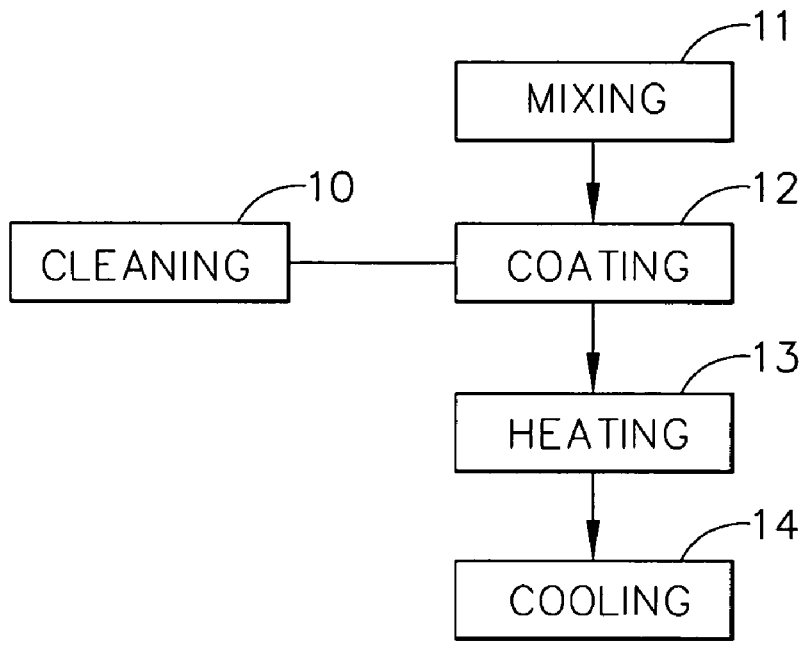
FIG. 1 schematically depicts the steps or acts of a brazing method according to an embodiment of the present invention.
Figure 2:
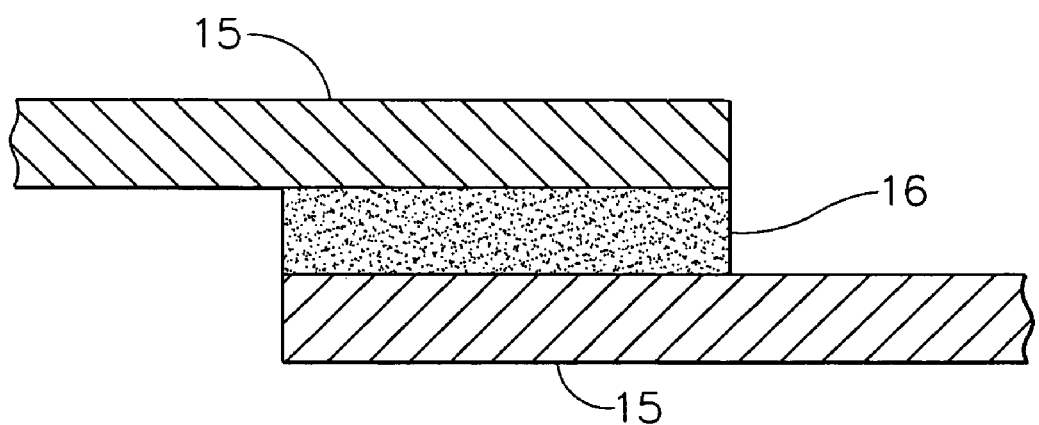
FIG. 2 is a side view of a base material brazed with a braze material according to an embodiment of the present invention.

FIGS. 1 and 2 depict the overall steps or acts of a brazing cycle according to one embodiment of the present invention. The base materials 15 to be brazed together undergo a cleaning step or act 10. For one embodiment, the base material 15 comprises Ti-15 Mo-3 Nb-3 Al 0.2 Si (Beta 21S). Either before, concurrently, or after the cleaning step 10, the components of a braze material are mixed in a mixing step or act 11 to form a braze mixture. According to one embodiment of the invention, the braze mixture comprises 57 Ti-19 Cu-24 Ni. According to another embodiment, the braze mixture comprises 50 Ti-18Cu-22 Ni-10Ag. According to another embodiment of the invention, the braze mixture comprises 55Ti-20Cu-20Ni-5Fe. In a coating step or act 12, the braze mixture is applied to at least one of the two pieces of base materials 15 to be joined together. Next, the base materials 15 are heated in a heating step or act 13 up to a brazing temperature such that a braze joint 16 is formed between the braze materials and the base materials 15. Thereafter, the braze joint 16 is subjected to a cooling step or act 14, whereby the braze joint 16 solidifies.

In more particularly describing the steps or acts of an embodiment of the present invention, it should be understood that the base materials 15 to be brazed can vary both in thickness and composition. However, the present invention can be extremely useful for thin foils or gages of base material 15 on the order of about 0.002 to 0.090 inches thick. Likewise, the brazing cycle is particularly useful for what may be termed "substantially isomorphous beta phase only titanium alloys." Those alloys are intended to be distinguished from alloys that can be termed "substantially alpha phase only titanium alloys" and "alpha-beta titanium alloys." Further, the term "substantially isomorphous beta phase only titanium alloy" is intended to mean an alloy that primarily exists in a metastable beta phase at ambient temperatures. In contrast, the terms "substantially only alpha phase titanium alloy" and "substantially only near alpha phase titanium alloy" are intended to mean an alloy that primarily exists in an alpha phase at ambient temperatures. Similarly, the term "alpha-beta titanium alloy" is intended to mean an alloy having substantial amounts of both alpha and beta phases at ambient temperatures.

Examples of substantially isomorphous beta phase only titanium alloys include Ti-15 V-3 Cr-3 Sn-3 Al (Ti 15-3), Ti-15Mo-3Nb-3Al-0.2Si (Beta 21S) and Ti-13 V-11Cr-3Al. Substantially alpha (or near alpha) phase only titanium alloys include commercially pure titanium (CPTi), Ti-6Al-2Sn-4Zr-2Mo and Ti-5Al-2.5Sn. The alpha-beta titanium alloys include Ti-3Al-2.5 V, Ti-6Al-4 V and Ti-7 Al-4 Mo.

Irrespective of the particular composition of the base material 15, the base material 15 initially undergoes a cleaning step 10. The step or act 10 is intended to remove oxides present on the surface of the base material 15, as well as to degrease the base material 15. The manner of oxide removal and degreasing can occur by any known method practiced in the art. For example, the base material 15 can first undergo acid pickling in about 35% volume nitric acid and about 3 oz/gallon ammonium biflouride for about one minute to remove surface oxides. Thereafter, the base material 15 can be degreased in isopropanol. Other suitable means for accomplishing the cleaning step 10 include pickling in accordance with American Society of Testing and Materials (ASTM) specification B 600.

After the base material 15 is subjected to the cleaning step or act 10, the base material 15 can optionally be coated with a binder to assist in adhering the braze material to the base material 15 in step 12. While the particular binder may vary, it is generally characterized as a polymer adhesive having a very low residual ash content and that volatizes completely at temperatures below about 1000° F. Some examples of useful binders include Nicrobraz cements produced by Wall Colmonoy Corp. of Madison Heights, Mich. If the base material 15 is coated with a binder, the same preferably occurs just before the coating of the braze material. With such timing, the binder is still tacky and can better adhere to the base material 15 and the braze material.

Either before, during or after the cleaning step 10, the braze components of the braze material are mixed in the mixing step or act 11. As with the base material 15, the braze material can vary. But for an embodiment of the present invention, the braze mixture comprises substantially only of titanium, copper, and nickel. Also, optionally zirconia (Zr), a precious metal (for instance Ag) or M where M may be Fe, V, Cr, Co, Mo, Nb, Mn, Si, Sn, Al, B, Gd, Ge or combinations of them may be added in reduced quantities. Further, it is preferred that the Cu/Ni ratio be around 0.8 and that that portion of the mixture comprises about 45 wt. % and the Ti comprises about 55 wt. %. Usefully, the relative amounts of the constituents may be 40-70% by weight Ti in powder form with a particle size less than 60 µm, 15-24% by weight Ni in powder form with a particle size less than 60 µm, and 15-20% Cu in powder form with a particle size less than 60 µm. According to another embodiment, the relative amounts may be 30-70% by weight Ti in powder form with a particle size less than 60 µm, 15-24% by weight Ni in powder form with a particle size less than 60 µm, and 1-25% Ag (PM) in powder form with a particle size less than 60 µm. The brazing material may further comprise 0.5-20% by weight Zr in powder form and preferably 5% by weight with a particle size of 60 µm. A preferred embodiment of the brazing powders has a particle size ≦20 µm.

A braze material can be in various forms. The forms have included laminated foils, amorphous or rapid solidification foils, and powders. The present invention may utilize a powder form, and specifically a small particle size powder less than 60 µm and preferably about 20 µm. The pre alloyed powder form has been preferred because of its homogeneity compared to laminated strip and its significantly lower cost than amorphous or rapidly solidified foil.

In forming the powdered braze material, the process can include well known means in the art. However, powders can be obtained by purchasing them commercially, such as from Praxair in Danbury, Conn., or Micron Metals in Salt Lake City, Utah. In forming the braze powders, they can be made for example by plasma rotating electrodes, gas atomization, reaction synthesis and mechanical comminution.

Plasma rotating electrode powders are made by melting a spinning electrode using a plasma and the molten droplets (protected from oxidation) are then collected in a catch basin. Gas atomization involves pouring molten alloy through a compressed gas stream that breaks up the molten alloy into droplets. The droplets solidify as they fall into a catch basin. Reaction synthesis powders are made by combining fine particles (possibly elemental powders) to form larger particles of the desired composition. Mechanical comminution employs the grinding or pulverizing of a pre-alloyed ingot. The ingot is made by taking known weight amounts of the constituents and then melting them into an ingot shape. Mechanical comminution is sometimes preferred because of the economy of the process, but it presents safety concerns because of the explosive nature of any fine powder and the tendency of the mechanical comminution to produce sparks. These safety concerns are greatly increased with reactive materials such as Ti and Zr. Further explanation of several of these processes is provided in the American Society for Metals Handbooks by the American Society for Metal, Ninth edition (1984).

As described in the prior art section the mixing of the elemental powders was an approach which was considered possible, but very undesirable because of the non-homogeneity of the braze mixture and resultant braze joint, both in terms of composition and microstructure, which would result in a poor low strength joint. Also the non-homogeneity of the elemental powders would result in a slow sluggish melting of the braze, which would occur over a wide temperature range.

Upon completion of the mixing step 11, the coating step or act 12 occurs. Therein, the braze mixture may be coated on one or both of the two base materials 15 to be brazed together. The amount of braze mixture needed to accomplish the brazing may vary according to the size of the joint gap between the base materials. In general, the amount of the braze mixture is that which is necessary to ensure good fusion of the surfaces of the base materials 15. In the context of heat exchangers, typical joint gaps may range from about 0.001 to 0.003 inches. For these sizes of joint gaps and others which might range from about 0.001 to 0.01 inches, the amount of the braze mixture preferably used may be about 0.1 to 0.5 grams/in$^2$. By so doing, adequate filling of the joints may be achieved. Upon one or both of the base materials 15 being coated with the braze mixture, the base materials 15 can be juxtaposed to one another and placed in a mating relationship, such as that shown in FIG. 2 for purposes of example.

Next, the mated base materials 15 with the braze mixture therebetween may undergo the heating step or act 13. The heating may occur at a rate and up to a temperature to nearly melt the braze mixture. The heating step 13 may be carried out with the intent to provide a braze joint 16 which is characterized by, among other things, uniformity of braze constituent concentrations across the width of the joint. It may also be characterized by a substantially void free phase(s) and fillet formation with a low contact angle, all of which may be determined upon optical and scanning electron microscopy. As a consequence of the joint characteristics, the base material 15 may be characterized at the base-joint interface by minimal grain erosion.

To achieve the desired joint characteristics or morphology mentioned above, the heating step 13 preferably includes a step or act of securing the mated base materials 15 together to prevent movement. Otherwise, the formation of the braze joint 16 can be disturbed with a resulting deterioration of the above desired morphological characteristics. Various means can be employed to secure the base materials 15, such as by simply tying them with a nichrome wire or dead weight loading. After the base materials 15 are secured, the base material with the braze material may be placed in a vacuum furnace, and the braze material and base material heated for a given braze time to achieve thermal stability. The braze time may be less than 15 minutes and preferably around 5 minutes. The step of heating may be up to a temperature that is not more than a brazing temperature of the braze material. The brazing temperature may be between 900° C. and 950° C. and this may be at a range of 1.1 to 11° C./minute. This forms a braze joint between the braze and the base material. The titanium metal may be an isomorphous beta phase only titanium base material selected from the group consisting of Ti-15 V-3 Cr-3 Sn-3 Al and Ti-13 V-11 Cr-3 Al. The braze joint may also be cooled and/or solidified.

At the brazing temperature, the temperature is held for a braze time of about 0 to 15 minutes and, more preferably about 5 minutes. The length of the brazing time is sufficient to allow wetting and fusion but avoiding erosion of the base material 15 or excess diffusion of the braze mixture into the base material 15.

After the step 13 of heating, the base and braze materials are subjected to the step or act 14 of cooling from the brazing temperature and down to room temperature. The cooling step 14 allows the braze joint 16 to solidify. Various means of cooling the braze and base materials can be utilized, such as by vacuum and inert gas cooling. The rate of cooling can be any rate that does not lead to excess distortion of the assembled base materials 15. The term "excess distortion" is intended to mean loss of dimensions of the base material 15 details beyond a tolerable level for the desired application.

Figure 3:
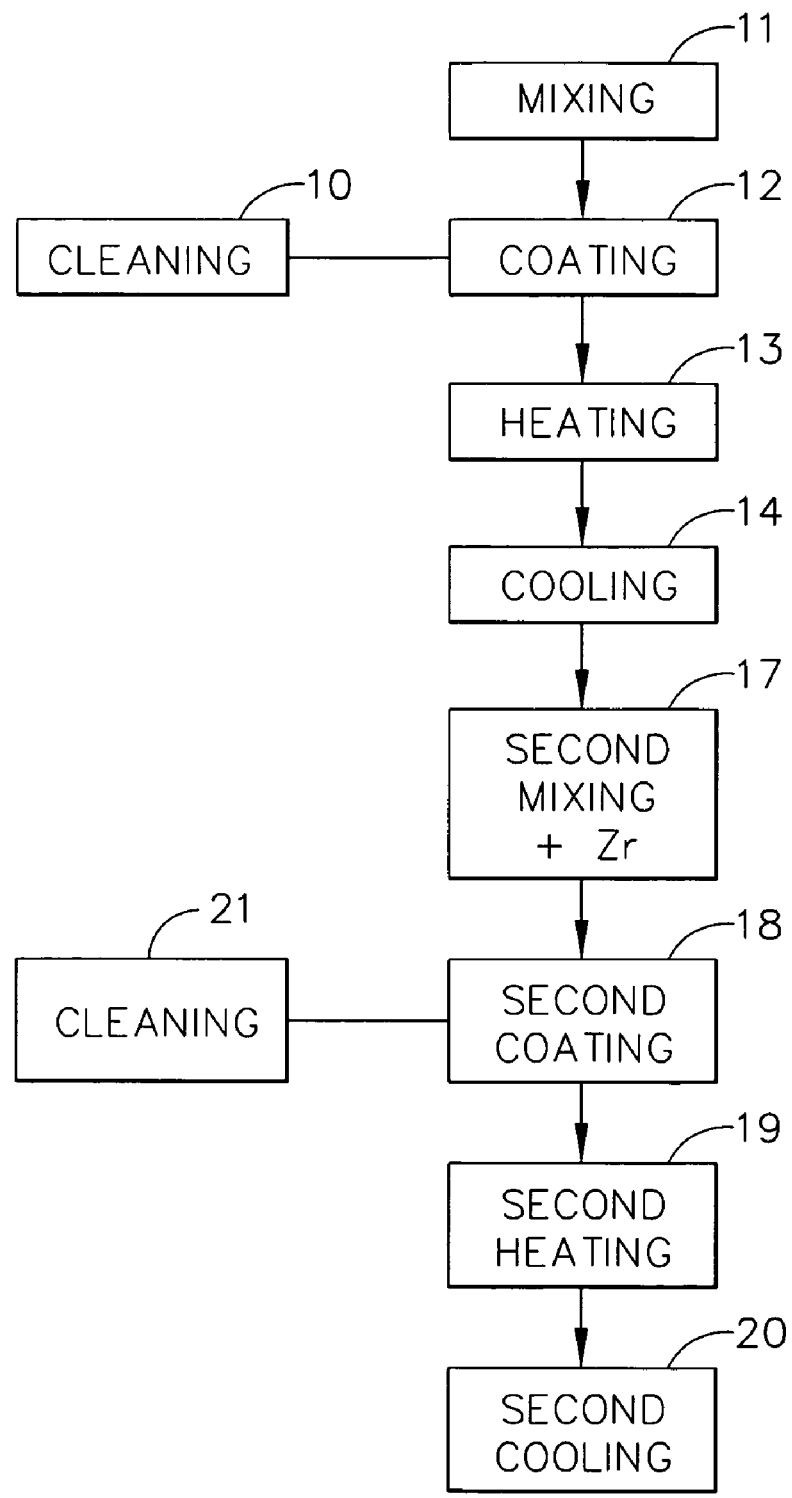
FIG. 3 schematically depicts the steps or acts of a brazing method according to another embodiment of the present invention.

As shown in FIG. 3, the metals may also be heated twice, with a first heating and a second heating. The purpose of a first and second heating, as compared to a single heating, may be to allow a rebraze of a part where the first braze was not 100% effective. The first heating act may be generally intended to braze the material. However, where leaks occur or the brazing is not 100% effective a second brazing may be desirable to rebraze the parts.

Figure 4:
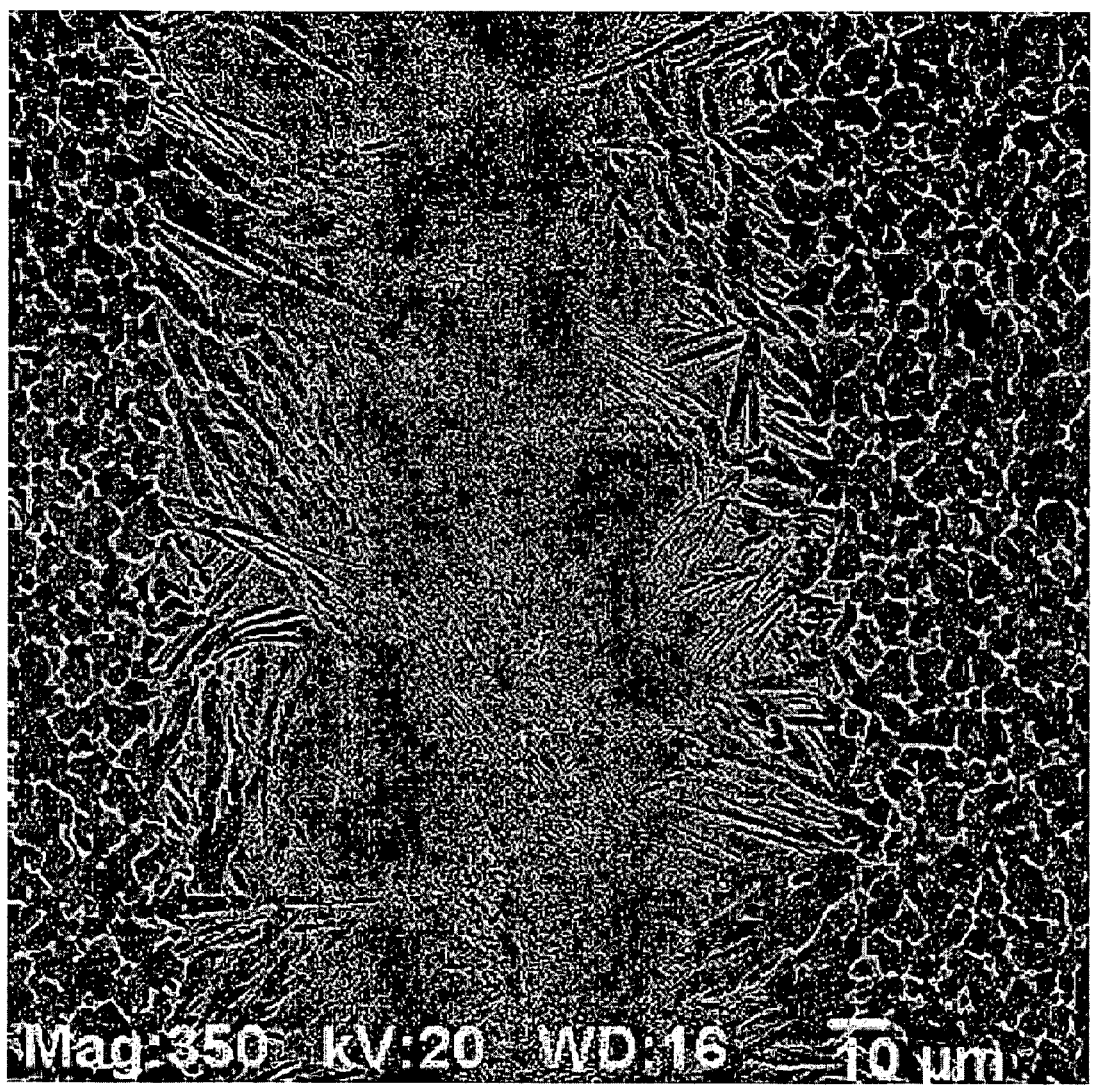
FIG. 4 depicts a scanning electron microstructure of a brazed joint of Ti21S made using a powder mixture of Ti Ni Cu Zr Ag with a particle size <44 µm (325 mesh). The uniformity of the braze and uniform distribution of the elements in the braze can be clearly seen.

A method of brazing a beta phase titanium metal is disclosed comprising the steps of coating a first braze material onto a base material. The base phase titanium metal may be an isomorphous beta phase only titanium base material selected from the group consisting of Ti-15 V-3 Cr-3 Sn-3 Al and Ti-13 V-11 Cr-3 Al. The braze material may be a mixed 11 to form a mixture, as discussed previously, of Ti, Cu, and Ni powders. According to another embodiment, the braze material may be Ti, Cu, Ni and Zr. According to another embodiment the braze may be Ti—Cu—Ni—Zr and or Ag (PM). According to yet another embodiment elements represented by M may be added to these three combinations where M is Fe, V, Cr, Co, Mo, Nb, Mn, Si, Sn, Al, B, Gd, Ge or combinations of them. The uniform braze microstructure that is obtained from using mixed <44 μm powders of Ti—Ni—Cu—Zr—Ag is shown in FIG. 4. In addition to the SEM microstructure shown, EDX maps showing the distribution of the braze elements were obtained (not shown), and they confirmed that simply mixing fine powders does produce a uniform distribution of the braze elements as indicated in the SEM image, despite the reports to the contrary in the prior art. The microstructure, FIG. 4, also indicates the braze has not been fully optimized and that too much braze material may have been used. Examples of these brazes and the braze temperatures are shown in Table 1. The mixture 11 may then coat 12 a base material and be heated 13 by placing the base material with the braze material in a vacuum furnace. A first heating of the braze material and the base material may be performed for a first braze time to achieve thermal stability between the braze material and the base material. The first braze time may be between 3 and 10 minutes and preferably 5 minutes. The first heating may be up to a temperature that is not more than a first brazing temperature of the braze material. The first brazing temperature may be between 850° C. and 950° C., preferably 900° C. and at a rate in the range of 1.1 to 11° C./minute.

The brazes may be checked to determine the success of brazing. Also, it may be assumed that there are some brazes that need rebrazing without inspection. If a second braze is desired, a second braze material may be mixed 17. This may be a mixture of Ti, Cu, Ni, Zr, Ag (PM) M as used in the first braze with further additions of Zr, Ag (PM) or M to further reduce the braze temperature, with possible compositions shown in Table 1. The second braze material may be coated 18 onto the base material. The base material may or may not be cleaned 21 prior to the application of the second braze material. The addition of the Zr, Ag (PM) or M provides a second braze with a melting point slightly lower than that of the first. A second heating 19 is performed of the braze material and the base material up to a second brazing temperature. The second brazing temperature may be between 800° C. and 900° C., preferably 830° C. and at a rate in a range of 1.1 to 7.7° C./minute. A second cooling 20 may also be performed.

TABLE 1

| ID | Ti wt % | Ni wt % | Cu wt % | PM wt % | Zr wt % | M wt % | Melt Temp. C. |
|---|---|---|---|---|---|---|---|
| 1 | 55 | 25 | 20 | | | | 925 |
| 2 | 50 | 25 | 18 | | 7 | | 880 |
| 4 | | | | | | | |
| 5 | 40 | 20 | 20 | 10 (Ag) | 10 | | 860 |
| 6 | 35 | 20 | 15 | 15 (Ag) | 15 | | 840 |
| 7 | 50 | 22 | 18 | 10 (Ag) | | | 880 |
| 8 | 45 | 25 | 20 | 10 (Pd) | | | 900 |
| 9 | 45 | 25 | 20 | 10 (Au) | | | 900 |
| 10 | 45 | 25 | 20 | 10 (Pt) | | | 900 |
| 11 | 53 | 25 | 20 | | | 2 (Si) | 880 |
| 12 | 52 | 25 | 20 | | | 3 (Co) | 890 |
| 13 | 50 | 25 | 20 | | | 5 (Mn) | 900 |
| 14 | 52 | 25 | 20 | | | 3 (Fe) | 880 |
| 15 | 53 | 25 | 20 | | | 2 (Cr) | 900 |
| 16 | 53 | 25 | 20 | | | 2 (Y) | 910 |
| 17 | 53 | 25 | 20 | | | 2 (Gd) | 900 |
| 18 | 53 | 25 | 20 | | | 2 (Nb) | 900 |
| 19 | 53 | 25 | 20 | | | 2 (Mo) | 900 |
| 20 | 53 | 25 | 20 | | | 2 (Sn) | 890 |
| 21 | 52 | 25 | 20 | | | 3 (V) | 890 |
| 22 | 53 | 25 | 20 | | | 2 (Al) | 890 |
| 23 | 52 | 25 | 20 | | | 3 (Ge) | 890 |

Table 1 Illustrates the compositions of the braze mixture and their braze temperatures. The compositions are not optimized and are intended primarily to illustrate the possible alternatives. These possibilities are further illustrated by a braze comprised of a mixture of <60 microns powder particles of 45 wt % Ti 25 wt % Ni 20 wt % Cu 5 wt % Al 2 wt % Sn 3 wt % Si, this successfully brazed Ti foils at a braze temperature of 860° F. This is not an optimized composition, but an example to illustrate the possibilities indicated in Table 1. The actual braze temperature varies slightly with furnace and size of the parts to be brazed. The above were all brazed using the same geometry parts in the same furnace.

An objective is to reduce the cost of the braze and one way to achieve this is to use elemental powders that are readily available, rather than prealloyed powders, which have to be specially cast in low volumes. However, certain of the additions described in Table 1 are readily available in an alloy form, for instance AlSi prealloyed powders. Using these commercially available prealloyed powders may be in some cases less expensive than using the separate elemental powders.

Figure 5A:
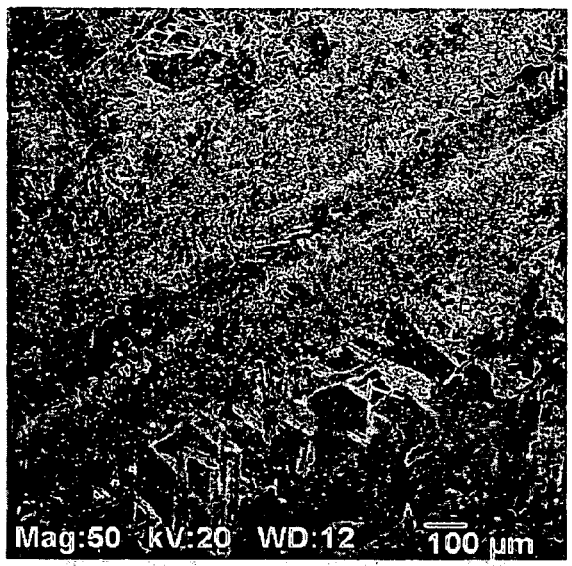
FIGS. 5a-c depict microstructures of a conventional braze.
Figure 5B:
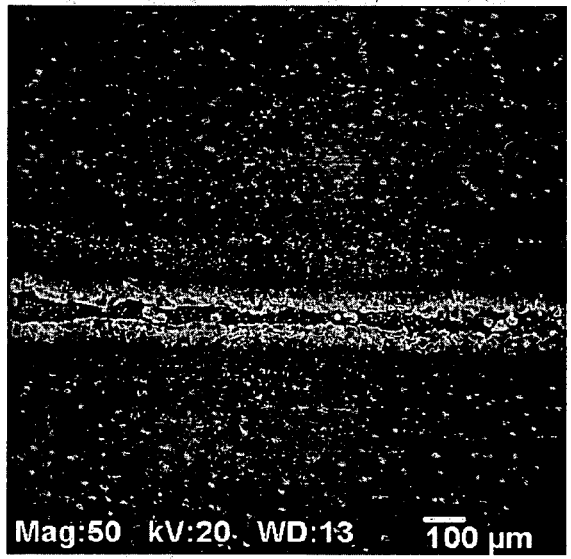
Figure 5C:
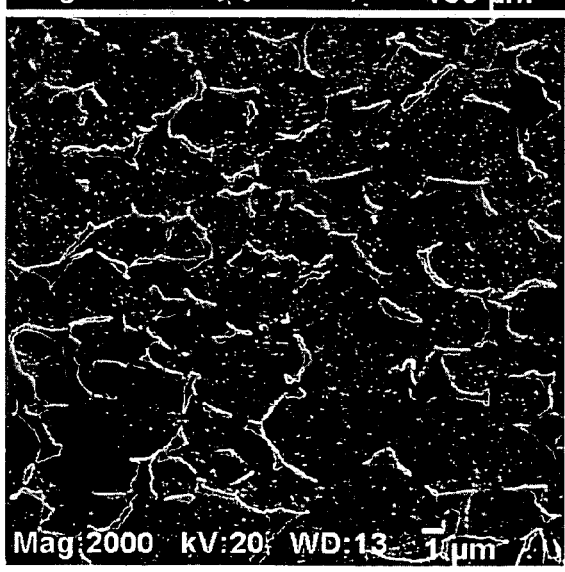

An advantage of the braze compositions indicated in Table 1 is the ability to reduce the braze temperature of both the first and second braze. This reduces the metallurgical coarsening of the base metals, such as grain growth. FIG. 5 shows how this can result in an order of 10 or greater decrease in grain size of the finished part. The grain size of the conventional braze in FIG. 5a is of the order of 1/10 of a millimeter while that of the add mixed powder FIG. 5c is of the order of microns. This reduction in braze temperatures also reduces the chance of oxidation of the base Ti which due to the reactive nature of Ti is always a problem even with good vacuum furnaces and the Ti tendency to oxidize increases rapidly with temperature. The reduced braze temperatures are important advantages that result in increased mechanical properties (strength, fatigue & ductility) of the finished part.

It should be understood, of course, that the foregoing relates to preferred embodiments of the invention and that modifications may be made without departing from the spirit and scope of the invention as set forth in the following claims.

We claim:

1. A brazing material for joining titanium metals comprising;
   a first powder for a first braze on a base material;
   a second powder for a second braze on the first brazed base material;
   the first powder comprising 54-76% by weight Ti, 12-24% by weight Ni, 12-22% by weight Cu, and a precious metal (PM) wherein the (Cu+PM)/Ni ratio is between 0.5 and 1.0;
   the second powder comprising Ti, Ni, Cu and PM;
   the second powder comprising 1-20 wt % more of PM than said first powder; and
   wherein the second powder has a brazing temperature lower than a brazing temperature of the first powder.

2. A brazing material as in claim 1, wherein said Ti, Ni, and Cu are in powder form with a particle size less than 60 microns.

3. A brazing material for joining titanium metals as in claim 1:
   wherein the second powder further comprises Zr;
   wherein the second powder comprises 0.5-12% by wt. Zr., 42-76 wt % Ti, 12-22% by weight Cu+PM; and
   wherein the (Cu+PM)/Ni ratio is between 0.5 and 1.0.

4. A braze material as in claim 3, wherein said Ti, Ni, Cu, PM and Zr are in particle form with a particle size of less than 60 microns.

5. A brazing material for joining titanium metals comprising:
   a first powder for a first braze on a base material;
   a second powder for a second braze on the first brazed base material;
   the first powder comprising 30-80 wt % Ti, 10-30 wt % Ni, 10-30 wt % Cu, and 1-20 wt % M, wherein M is selected from the group consisting of Fe, V, Cr, Co, Mo, Nb, Mn, Si, Sn, Al, B, Gd, and Ge and any combinations thereof;
   the second powder comprising Ti, Ni, Cu and M;
   the second powder comprising 1-20 wt % more of M than said first powder; and
   wherein said Ti, Ni, Cu and M are in powder form and have a particle size no greater than 20 microns.

6. A brazing material for joining titanium metals comprising:
   a first powder for a first braze on a base material;
   a second powder for a second braze on the first brazed base material;
   the first powder comprising 30-80 wt % Ti, 10-30 wt % Ni, 10- 30 wt % Cu+PM, and 1-20 wt % M, wherein the (Cu+PM)/Ni ratio is between 0.8 and 1.0, and M is selected from the group consisting of Fe, V, Cr, Co, Mo, Nb, Mn, Si, Sn, Al, B, Gd and Ge or any combinations thereof;
   the second powder comprising Ti, Ni, Cu, Zr and PM; and
   the second powder comprising 1-20 wt % more of (PM+Zr) than said first powder.

7. A brazing material as in claim 6, wherein said Ti, Ni, Cu, PM and M of the first powder are in powder form and have a particle size less than 60 microns.

8. A brazing material as in claim 6:
   wherein the second powder comprises 0.5-12 % by wt. (PM+Zr).

9. A braze material as in claim 8 wherein said Ti, Ni, Cu, PM, M, and Zr of the second powder are in powder form and have a particle size less than 60 microns.

* * * * *